(12) United States Patent
Shehi et al.

(10) Patent No.: US 9,097,529 B2
(45) Date of Patent: Aug. 4, 2015

(54) AIRCRAFT SYSTEM AND METHOD FOR IMPROVING NAVIGATION PERFORMANCE

(75) Inventors: Christopher John Shehi, Morristown, NJ (US); Reginald Crocker, Morristown, NJ (US); Kimberly TenPasBell, Morristown, NJ (US); James Johnson, Morristown, NJ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 404 days.

(21) Appl. No.: 13/547,167

(22) Filed: Jul. 12, 2012

(65) Prior Publication Data

US 2014/0019038 A1     Jan. 16, 2014

(51) Int. Cl.
    *G01C 23/00*      (2006.01)

(52) U.S. Cl.
    CPC ...................................... *G01C 23/00* (2013.01)

(58) Field of Classification Search
    CPC ........ G01C 21/00; G01C 21/20; G01C 21/24; G01C 21/32; G01C 21/343; G01C 21/3415; G01C 21/3492; G01C 21/3453; G01C 21/3484; G01C 21/3461; G01C 21/3664; G01C 21/3407
    USPC ........................................................ 701/416
    See application file for complete search history.

(56) References Cited

U.S. PATENT DOCUMENTS

| | | | | |
|---|---|---|---|---|
| 4,806,940 A | * | 2/1989 | Harral et al. | 342/451 |
| 5,703,591 A | * | 12/1997 | Tognazzini | 342/30 |
| 5,771,484 A | * | 6/1998 | Tognazzini | 701/117 |
| 5,872,526 A | * | 2/1999 | Tognazzini | 340/961 |
| 5,884,223 A | * | 3/1999 | Tognazzini | 701/301 |
| 5,906,657 A | * | 5/1999 | Tognazzini | 709/248 |
| 6,076,042 A | * | 6/2000 | Tognazzini | 701/301 |
| 6,118,401 A | * | 9/2000 | Tognazzini | 342/29 |
| 6,259,977 B1 | * | 7/2001 | Mayer et al. | 701/14 |
| 6,278,965 B1 | * | 8/2001 | Glass et al. | 703/22 |
| 6,606,035 B2 | * | 8/2003 | Kapadia et al. | 340/972 |
| 6,763,289 B2 | * | 7/2004 | Leonard et al. | 701/3 |
| 7,113,852 B2 | * | 9/2006 | Kapadia et al. | 701/36 |

(Continued)

FOREIGN PATENT DOCUMENTS

EP      1273987 B1      9/2007

OTHER PUBLICATIONS

"Area_navigation" http://en.wikipedia.org/wiki/Area_navigation.*

(Continued)

*Primary Examiner* — James Trammell
*Assistant Examiner* — James E Stroud
(74) *Attorney, Agent, or Firm* — Ingrassia Fisher & Lorenz, P.C.

(57) ABSTRACT

A high integrity navigation system and method are provided. The method comprises performing a cyclic redundancy check (CRC) of a desired flight path of an aircraft, for example an approach to an airport, and comparing the CRC with a stored CRC performed on the identified flight path. If the comparison exceeds a first threshold, a first alert is provided wherein the pilot is to perform a published missed approach. A second alert, also requiring a missed approach, is provided when one or more comparisons are performed of a sensor position of the aircraft with the high integrity flight path; a defined flight path with the high integrity flight path; and the sensor position with an aircraft position determined by a flight management system, and thresholds are exceeded.

17 Claims, 2 Drawing Sheets

(56) References Cited

U.S. PATENT DOCUMENTS

| | | | |
|---|---|---|---|
| 7,353,090 B2* | 4/2008 | Leonard et al. | 701/3 |
| 7,685,384 B2* | 3/2010 | Shavit | 711/162 |
| 7,735,005 B2* | 6/2010 | Holder et al. | 715/243 |
| 7,869,384 B2* | 1/2011 | Fang et al. | 370/256 |
| 7,899,585 B2 | 3/2011 | Rouquette et al. | |
| 8,473,124 B2* | 6/2013 | Shue et al. | 701/4 |
| 8,587,590 B2* | 11/2013 | Erickson et al. | 345/440 |
| 8,665,121 B2* | 3/2014 | Shavit | 340/978 |
| 2003/0225492 A1* | 12/2003 | Cope et al. | 701/35 |
| 2004/0008253 A1* | 1/2004 | Monroe | 348/143 |
| 2004/0095466 A1* | 5/2004 | Galasso | 348/143 |
| 2005/0174235 A1* | 8/2005 | Davis et al. | 340/539.13 |
| 2007/0219831 A1* | 9/2007 | Ne'meth | 705/4 |
| 2007/0236366 A1* | 10/2007 | Gur et al. | 340/945 |
| 2007/0250224 A1* | 10/2007 | Dwyer | 701/16 |
| 2008/0140270 A1 | 6/2008 | Davis et al. | |
| 2009/0112464 A1* | 4/2009 | Belcher | 701/210 |
| 2010/0256840 A1* | 10/2010 | Call et al. | 701/17 |
| 2011/0035080 A1 | 2/2011 | Murphy | |
| 2011/0246000 A1* | 10/2011 | Shavit | 701/14 |
| 2011/0246001 A1* | 10/2011 | Shavit | 701/14 |
| 2011/0246002 A1* | 10/2011 | Shavit | 701/14 |
| 2013/0046423 A1* | 2/2013 | McCarthy et al. | 701/14 |
| 2014/0119667 A1* | 5/2014 | Erickson et al. | 382/210 |

OTHER PUBLICATIONS

"Instrument_approach"; http://en.wikipedia.org/wiki/Instrument_approach.*

"Instrument_landing_system"; http://en.wikipedia.org/wiki/Instrument_landing_system.*

"VHF_omnidirectional_range"; http://en.wikipedia.org/wiki/VHF_omnidirectional_range.*

DO-178B, "Software Considerations in Airborne Systems and Equipment Certification"; Leslie A. (Schad) Johnson; http://www.dcs.gla.ac.uk/~johnson/teaching/safety/reports/schad.html.*

"Review of Local Area Augmentation System (LAAS) Flight Inspection Requirements, Methodologies, and Procedures for Precision Approach, Terminal Area Path, and Airport Surface Guidance Operations"; Michael F. DiBenedetto, Ph.D.; Technical Memorandum OU/AEC 07-01TM15689/2-1; http://www.avn.faa.gov/content/fioo/pdf/TM_07-01_LAAS_Final.pdf.*

* cited by examiner

AIRCRAFT SYSTEM AND METHOD FOR IMPROVING NAVIGATION PERFORMANCE

TECHNICAL FIELD

The exemplary embodiments described herein generally relates to aircraft navigation and more particularly to a system and method for improving the ability of an aircraft to navigate by Required Navigation Performance (RNP).

BACKGROUND

The approach and landing is the most difficult phase of a flight due to the precision actions required and increased pilot workload. While flying the instrument approach, pilots are trained to monitor progress and make adjustment with reference to the flight instruments, e.g., the Flight Director (FD), the glide path deviation scale, and the Horizontal Situation Indicator (HSI). These standard flight instruments which are driven by a Flight Management System (FMS) have been designed to provide guidance cues in an accurate and unambiguous manner. Governmental bodies throughout the world, such as the Federal Aviation Administration (FAA) in the United States, provide standards and certify FMS software for general safety in the aviation industry. The certification of the FMSs are rated at a specific Design Assurance Level (DAL), which is determined from the safety assessment process and hazard analysis by examining the effects of a failure condition in the system.

Many aircraft FMSs are designed and certified to software DAL C (level C), as defined in DO-178B, Software Considerations in Airborne Systems and Equipment Certification. However, many instrument approaches require a navigation system certified to DAL B. Therefore, a level C FMS is not able to fly these more stringent approaches.

RNP is RNAV with the addition of an onboard performance monitoring and alerting capability. A defining characteristic of RNP operations is the ability of the aircraft navigation system to monitor the navigation performance it achieves and inform the crew if the requirement is not met during an operation. This onboard monitoring and alerting capability enhances the pilot's situation awareness and can enable reduced obstacle clearance or closer route spacing without intervention by air traffic control.

RNP is a type of performance-based navigation that defines the level of performance required by an aircraft for a specific maneuver, for example, the approach to an airport. The current specific requirements of an RNP system include the capability to follow a desired ground track, including curved paths, with reliability, repeatability and predictability; and where vertical profiles are included for vertical guidance, use of vertical angles or specific altitude constraints are used to define a desired vertical path. Performance monitoring and alerting capabilities may be provided in different forms depending on the system installation, architecture and configurations, including display and indication of both the required and the estimated navigation system performance; monitoring of the system performance and alerting the crew when RNP requirements are not met; and cross track deviation displays scaled to RNP, in conjunction with separate monitoring and alerting for navigation integrity.

An RNP system utilizes its navigation sensors, system architecture, and modes of operation to satisfy the RNP navigation specification requirements. It must perform the integrity and reasonableness checks of the sensors and data, and may provide a means to deselect specific types of navigation aids to prevent reversion to an inadequate sensor. RNP requirements may limit the modes of operation of the aircraft where flight technical error (FTE) is a significant factor. Dual system/sensor installations may also be required depending on the intended operation or need.

Generally, aircraft utility is increased through the capability to fly to lower minimums, or a minimum altitude below which the crew either sees the runway or executes a missed approach. In RNP approaches, the lower the minimums, the lower the RNP value. Current certification guidance allows an RNP value of 0.3 NM (the width of the path in which the airplane is expected to remain) to be flown by an FMS with DAL C. For lower values of RNP, for example, 0.29 NM down to 0.10 NM, which translate to lower minimums, current certification guidance expects the FMS (and other critical avionics) to be certified to DAL B.

Accordingly, it is desirable to provide a system and method for improving the ability of an aircraft to navigate by improving navigation reliability. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method improve the ability of an aircraft to navigate by improving navigation reliability.

A first exemplary embodiment comprises a method allowing an aircraft to navigate by required navigation performance, the aircraft including a flight management system, a processor, and a display, the method comprising storing a plurality of flight paths and a first cyclic redundancy check for each of the flight paths in the flight management system; identifying one of the flight paths as a desired flight path in the flight management system; displaying the desired flight path; computing a second cyclic redundancy check by the processor for the desired flight path; comparing by the processor the first cyclic redundancy check of the identified flight path with the second cyclic redundancy check; providing a first alert signal by the processor to the display when the comparison of the first cyclic redundancy check of the identified flight path with the second cyclic redundancy check exceeds a first threshold; determining a sensor position of the aircraft by an external sensor of the aircraft; comparing within the processor the sensor position with the high integrity flight path; and providing by the processor a second alert signal and the high integrity flight path to the display when the comparison of the sensor position with the high integrity flight path exceeds a second threshold; displaying a first alert when the first alert signal is provided; and displaying a second alert when the second alert signal is provided.

A second exemplary embodiment comprises a method allowing an aircraft to navigate by required navigation performance, the aircraft including a flight management system, a processor, and a display, the method comprising storing a plurality of flight paths and a first cyclic redundancy check for each of the flight paths in the flight management system; identifying one of the flight paths as a desired flight path in the flight management system; computing a second cyclic redundancy check by the processor for the desired flight path; comparing by the processor the first cyclic redundancy check of the identified flight path with the second cyclic redundancy check; providing a first alert signal by the processor to the display when the comparison of the first cyclic redundancy check of the identified flight path with the second cyclic redundancy check exceeds a first threshold; performing at least one of the actions selected from the group consisting of comparing within the processor a sensor position of the aircraft as determined by the processor with a high integrity flight path; determining a defined flight path by the flight management system and comparing the defined flight path with the high integrity flight path; and comparing the sensor position with an aircraft position determined by the flight management system; providing by the processor a second alert signal to the display when at least one of the actions exceeds a threshold; displaying on the display a first alert when the first alert signal is provided; and displaying on the display a second alert when the second alert signal is provided.

A third exemplary embodiment comprises an aircraft navigation system comprising a flight management system including a navigation database and configured to store a plurality of flight paths and a first cyclic redundancy check for each of the flight paths; and identify one of the flight paths; determine a sensor position of the aircraft; a processor coupled to the flight management system, the processor configured to compute a second cyclic redundancy check for the identified flight path; compare the first cyclic redundancy check with the second cyclic redundancy check; and provide a first alert signal to the display when the comparison of the first cyclic redundancy check with the second cyclic redundancy check exceeds a first threshold; determine a high integrity flight path; compare the sensor position with the high integrity flight path; and provide a second alert signal and the high integrity flight path when the comparison of the sensor position with the high integrity flight path exceeds a second threshold; and a display coupled to the flight management system and configured to display a first alert in response to the first alert signal; and display a second alert in response to the second alert signal.

BRIEF DESCRIPTION OF THE DRAWINGS

The present invention will hereinafter be described in conjunction with the following drawing figures, wherein like numerals denote like elements.

DETAILED DESCRIPTION

Figure 1:
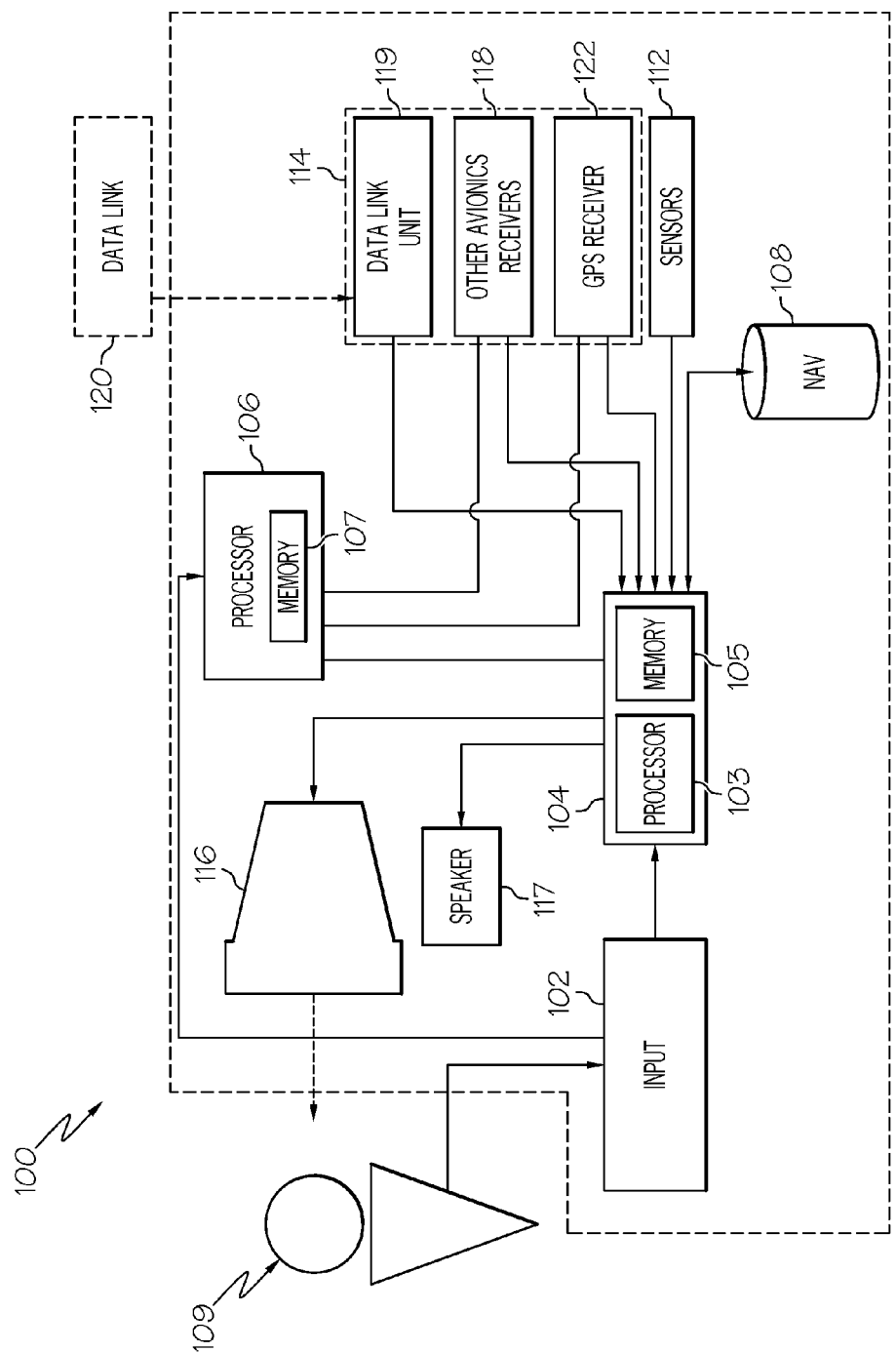
FIG. 1 is a block diagram of a navigation system in accordance with the exemplary embodiments.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

A monitor (software) independently performs a cyclic redundancy check (CRC) of an identified flight path of an aircraft, for example an approach to an airport, and compares the CRC with another CRC performed on the identified flight path from a plurality of stored flight paths. If the comparison exceeds a first threshold, a first alert is provided wherein the pilot is to perform a published missed approach. If the first threshold is not exceeded, the aircraft actual flight path is determined, and a comparison of the aircraft's position determined by the FMS with the identified flight path is made. If this comparison exceeds a second threshold, a second alert and a new flight path are provided, wherein the pilot is to perform a missed approach using the new flight path. If the second threshold is not exceeded, the approach may be continued. Additional comparisons may include the actual flight path with the identified flight path, and the sensor position with a position determined by the FMS. If these thresholds are exceeded, the second alert and the new flight path are provided, wherein the pilot is to perform a missed approach using the new flight path. If these thresholds are not exceeded, the approach may be continued. This monitor and method provides a rating of level design assurance level B (DAL-B) or better, as defined in DO-178B, Software Considerations in Airborne Systems and Equipment Certification.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Referring to FIG. 1, an exemplary flight deck navigation system 100 is depicted and will be described for implementing the present invention. The system 100 includes a user interface 102, a navigation computer 104 (for example, an FMS), a processor 106, one or more navigation databases 108, various optional sensors 112, various external data sources 114, and a display device 116. In some embodiments the user interface 102 and the display device 116 may be combined in the same device, for example, a touch pad. The user interface 102 is in operable communication with the FMS 104 and the processor 106 and is configured to receive input from a user 109 (e.g., a pilot) and, in response to the user input, supply command signals to the FMS 104 and the processor 106. The user interface 102 may be any one, or combination, of various known user interface devices including, but not limited to, a cursor control device (not shown), such as a mouse, a trackball, or joystick, and/or a keyboard, one or more buttons, switches, or knobs.

The FMS 104 may include one of numerous known general-purpose microprocessors 103 or an application specific processor that operates in response to program instructions. In the depicted embodiment, the FMS 104 includes on-board memory 105. The program instructions that control the processor 103 may be stored in the memory 105. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The processor 106 operates to monitor the navigation of the aircraft, and is coupled to the FMS 104, GPS receiver 122 and the other avionics receivers 118. The processor includes memory (107) for storing instructions (software) and data from the FMS 104, GPS receiver 122, and other avionics receivers 118.

The memory 105, 107 may be realized as RAM memory, flash memory, EPROM memory, EEPROM memory, registers, a hard disk, a removable disk, a CD-ROM, or any other form of storage medium known in the art. In this regard, the memory 105, 107 can be coupled to the processor 103, 106, respectively, such that the processors 103, 106 can be read information from, and write information to, the memory 105, 107. In the alternative, the memory 105 may be integral to the processor 103, and the memory 107 may be integral to the processor 106. As an example, the processor 106 and the memory 107 may reside in an ASIC. In practice, a functional or logical module/component of the navigation system 100 might be realized using program code that is maintained in the memory 107.

The processors 103, 106 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

No matter how the processor 103 is specifically implemented, it is in operable communication with the processor 106, the navigation databases 108, and the display device 116, and is coupled to receive various types of aircraft state data from the various sensors 112, and various other environment related data from the external data sources 114. The processor 103 is configured, in response to the inertial data and the avionics-related data, to selectively retrieve navigation data from one or more of the navigation databases 108, and to supply appropriate display commands to the display device 116. The display device 116, in response to the display commands from, for example, a touch screen, keypad, cursor control, line select, concentric knobs, voice control, and data link message, selectively renders various types of textual, graphic, and/or iconic information. The preferred manner in which the textual, graphic, and/or iconic information are rendered by the display device 116 will be described in more detail further below. Before doing so, however, a brief description of the databases 108, the sensors 112, and the external data sources 114, at least in the depicted embodiment, will be provided.

The navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the navigation databases 108 are, for clarity and convenience, shown as being stored separate from the FMS 104, all or portions of either or both of these databases 108 could be loaded into the memory 105, or integrally formed as part of the processor 103, and/or memory 105. The navigation databases 108 could also be part of a device or system that is physically separate from the system 100.

The sensors 112 may be implemented using various types of sensors, systems, and or subsystems, now known or developed in the future, for supplying various types of aircraft state data. The state data may also vary, but preferably include data representative of the geographic position of the aircraft and also other data such as, for example, aircraft speed, heading, altitude, and attitude.

The number and type of external data sources 114 (or subsystems) may also vary, but typically include for example, a GPS receiver 122, other avionics receivers 118 including, for example, a VOR/ILS, and a data link unit 119. The other avionics receivers would include, for example, a terrain avoidance and warning system (TAWS), a traffic and collision avoidance system (TCAS), a runway awareness and advisory system (RAAS), a flight director, and a navigation computer.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

In operation, the display device 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display device 116 is suitably designed to process data obtained from the sources of flight status data in the manner described in more detail herein. In particular, the display device 116 can use the flight status data of the host aircraft when rendering the SVS display.

Onboard data link 119 is coupled to external data link 120 and is configured to receive data from ground stations and other aircraft. Examples of the data received include, for example, weather information, traffic information, route changes, and clearances and alerts (including NOTAMS). In accordance with the present exemplary embodiments, the onboard data link unit 119 receives navigation routes, for example, approaches to an airport, and a cyclic redundancy check (CRC) for each of the navigation routes.

Figure 2:
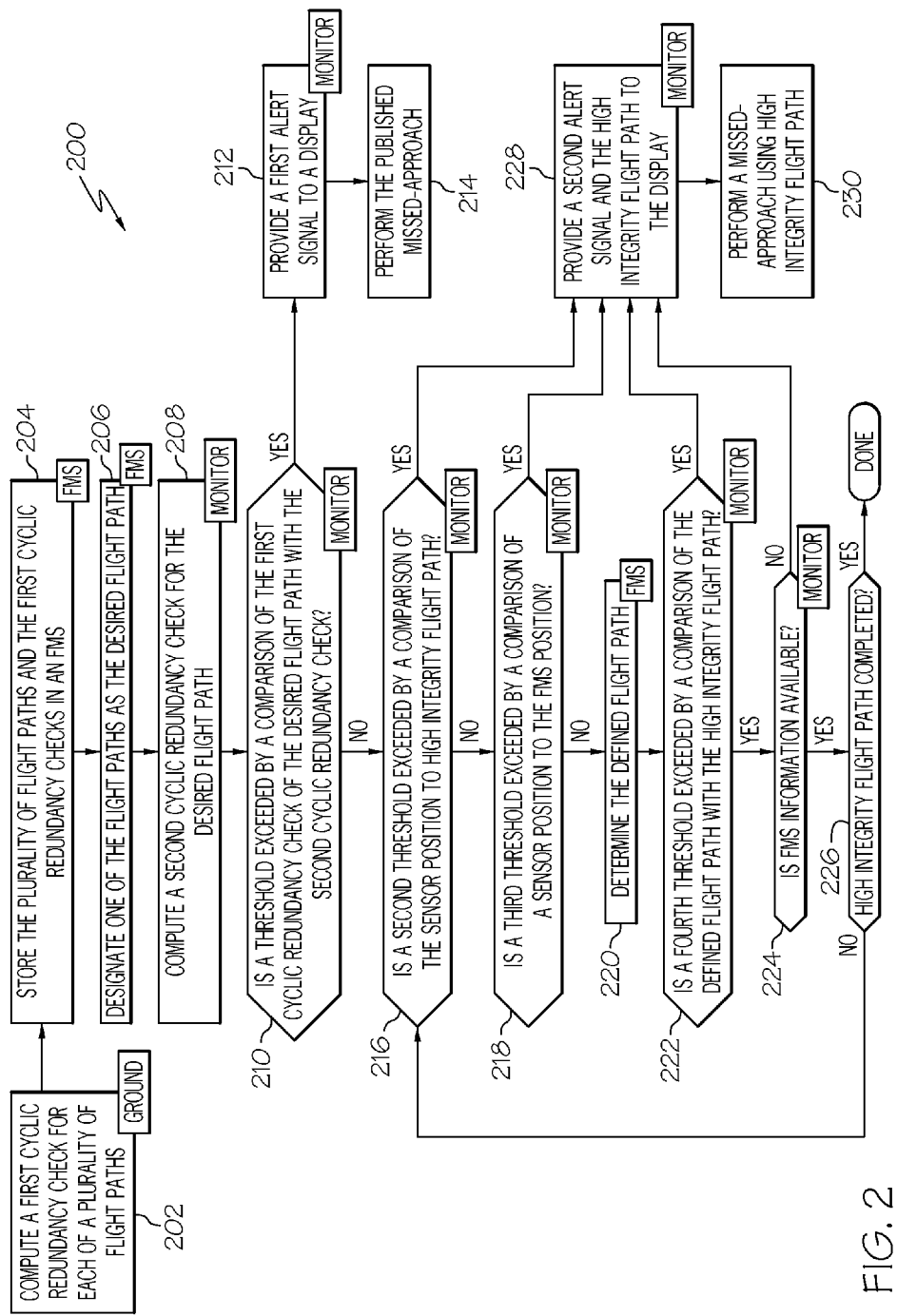
FIG. 2 is a flow chart of a method for navigating an aircraft in accordance with an exemplary embodiment.

FIG. 2 is a flow chart that illustrates an exemplary embodiment of a navigation process 200 suitable for use with a flight deck display system such as the navigation system 100. Process 200 represents one implementation of a method for displaying aircraft traffic information on an onboard display element of a host aircraft. The various tasks performed in connection with process 200 may be performed by software, hardware, firmware, or any combination thereof. For illustrative purposes, the following description of process 200 may refer to elements mentioned above in connection with FIG. 1. In practice, portions of process 200 may be performed by different elements of the described system, e.g., a processor, a display element, or a data communication component. It should be appreciated that process 200 may include any number of additional or alternative tasks, the tasks shown in FIG. 2 need not be performed in the illustrated order, and process 200 may be incorporated into a more comprehensive procedure or process having additional functionality not described in detail herein. Moreover, one or more of the tasks shown in FIG. 2 could be omitted from an embodiment of the process 200 as long as the intended overall functionality remains intact.

Referring to FIG. 2, the method includes computing 202 a first cyclic redundancy check (CRC) for each of a plurality of flight paths, for example, approaches to airports. This step 202 is preferably accomplished on the ground and provided to the aircraft typically once every 28 days. The flight paths and the first CRCs are stored 204 in the FMS 104 of the aircraft. A desired flight path is identified 206 (which may be accomplished by a stored flight plan in the FMS 104 or selected by the pilot), and a second CRC is calculated 208 in the processor 106 for the identified flight path.

If a comparison of the first CRC of the identified flight path with the second CRC exceeds a threshold 210, a first alert is provided 212 to the display 116 and optionally to the speaker 117, wherein the pilot would initiate 214 the published missed approach.

If a comparison of the first CRC of the identified flight path with the second CRC does not exceed 210 the threshold, if 216 a comparison of the sensor position with a high integrity flight path does not exceed a second threshold, if 218 a comparison of a sensor position of the actual aircraft and the position determined by the FMS does not exceed a third threshold, the FMS 104 determines 220 an actual flight path, and if 222 a comparison 218 of the defined flight path with the high integrity flight path by the processor 106 does not exceed a second threshold 218, if 224 the FMS 104 information is available, and if 226 the high integrity flight path is not completed, the comparison 216 is repeated. If any of the second, third, and fourth thresholds are exceeded, the second alert signal and the high integrity flight path are provided 228 to the display 116 and optionally to the speaker 117. The pilot would then execute 230 a missed approach using the high integrity flight path.

The monitor includes creation of a data entry, FMS functions, and a monitoring function. The data entry is the generation of the navigation database for the FMS 104. This data entry preferably happens every 28 days and includes a new storage element, called an RNP Final Approach Segment (RFAS) datablock. The process that generates 202 the navigation database will collect the waypoints and legs of a plurality of final approach segment flight paths and store 204 them separately in the RFAS datablock. The process will also compute 208 a cyclic redundancy check (CRC) based on the contents of the RFAS datablock and append the resultant value to the RFAS datablock. The RFAS datablock represents a high-integrity data representation of at least a portion of the flightplan, for example, the final approach portion. It is preferred the RFAS datablock is created for each approach in the database that makes use of the monitoring function, and preferably an RFAS datablock will be generated for each low RNP minimum within an RNP approach.

The data entry creating 202 the RFAS datablock is loaded prior to a flight (when the navigation database is created). Data included in the RFAS data block may include for each airport at least one runway, a route type, an RNP level requirement, final approach fix latitude and longitude, the number of legs between the final approach fix and the missed approach point, the calculated CRC, and for each leg: leg type, for example, track-to-fix or radius-to-fix, waypoint latitude and longitude, arc center latitude and longitude, radius, and turn direction.

The FMS stores 204 the navigation database including the RFAS datablock. When an approach is selected 206 by the aircrew that has an associated RFAS datablock, the FMS will make the RFAS datablock available via a databus.

The monitoring function will read the RFAS datablock that has been posted on the databus, compute 208 the CRC of the data using the same algorithm as the database generator element, and will compare 210 the results of this computation with the CRC value embedded in the RFAS datablock. If the values do not agree, then it is concluded the data in the RFAS datablock has been corrupted and the monitor cannot be used for the approach. Assuming the CRC comparison agrees, the monitoring function will use the aircraft position from navigation sensors, for example, the GPS or ILS, and compute the aircraft position along the flight path, for example, the final approach course, as described in the RFAS datablock. From this the monitoring function will compute the cross-track deviation from the final approach course. The monitor may issue 228 an alarm when the cross-track value exceeds a given value, e.g., the RNP value of the approach (which is listed in units of nautical miles), or the monitor may issue an alarm after the cross-track value is compared to a different cross-track value, for example, the crosstrack value computed by the FMS, and the difference is found to exceed a threshold. Optionally, the monitor could issue an alarm for either condition. When the monitor determines an alarm condition has been detected, it will alert the crew through the crew interface (a display and optionally, an audio signal).

The preferred embodiment includes five states that the display and monitor function may display to the aircrew. State 1: the monitor and display function are not active (the approach field is displayed in a first format, for example, white). State 2: the monitor and display function indicate the system is within tolerance during the approach segment (displayed in a second format, for example, green). State 3: the monitor and display function cannot support the selected minimums (displayed in a third format, for example, yellow), for which the aircrew may continue the approach to an alternate minimum or execute a missed approach. State 4: the monitor and display function indicate a missed approach because the system cannot support any minimums for the selected approach (displayed in a fourth format, for example, orange).

When an approach has been loaded into the FMS, the system will transition to state 1 when the approach is selected. The system will transition to state 0 if the aircrew initiates a missed approach, changes the destination or approach, or completes the approach. The system will transition to state 3 if the minimum is a low-RNP value and the desired minimum is available, and to state 4 if the desired minimum is not available.

The display function will initiate an alarm if a threshold is exceeded in one of several situations, for example, position estimation, path steering, path definition, and FMS health.

Four alarm computations will be present and are described in the following paragraphs. Any one alarm exceeding its threshold will initiate the monitor alert.

A position estimation algorithm will compute the absolute distance between the FMS position and the raw sensor (GPS or Hybrid IRS) position. The alarm threshold will be the computed distance compared to the greater of 1.5 times the current figure of merit (FOM) of the sensor and 1.0 times the current RNP value.

A path steering algorithm will compute the crosstrack distance between the raw sensor position and the monitor-computed path centerline of the approach. The alarm threshold will be the computed distance compared to the greater of 1.5 times the current RNP value. This alarm algorithm will only be active if the autopilot is engaged and the lateral flight-director mode is LNAV.

A path definition algorithm will compute the delta distance between the FMS current-leg crosstrack error and the monitor-computed cross-track error. The alarm threshold will be the greater of 1.5 times the current FOM (Figure Of Merit) of the sensor and 1.0 times the current RNP value.

A FMS health algorithm will monitor key output data from the FMS. If that data is not fresh and valid for 6 seconds, the alarm threshold will be met.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method allowing an aircraft to navigate by required navigation performance, the aircraft including a flight management system, a processor, and a display, the method comprising:
   storing a plurality of flight paths and a first cyclic redundancy check for each of the flight paths in the flight management system;
   identifying one of the flight paths as a desired flight path in the flight management system;
   providing the identified flight path to the display;
   displaying the desired flight path even if the identified flight path is no longer being received by the display;
   computing a second cyclic redundancy check by the processor for the desired flight path;
   comparing by the processor the first cyclic redundancy check of the identified flight path with the second cyclic redundancy check;
   providing a first alert signal by the processor to the display when the comparison of the first cyclic redundancy check of the identified flight path with the second cyclic redundancy check exceeds a first threshold;
   determining a sensor position of the aircraft by an external sensor of the aircraft;
   comparing within the processor the sensor position with the high integrity flight path; and
   providing by the processor a second alert signal and the high integrity flight path to the display when the comparison of the sensor position with the high integrity flight path exceeds a second threshold;
   displaying a first alert when the first alert signal is provided; and
   displaying a second alert when the second alert signal is provided.

2. The method of claim 1 further comprising:
   providing by the processor the second alert signal and the new flight path to the display when a comparison of the sensor position with an aircraft position determined by the flight management system exceeds a third threshold.

3. The method of claim 1 further comprising:
   determining a defined flight path by the flight management system; and
   providing by the processor the second alert signal and the high integrity flight path to the display when a comparison of the defined flight path with the high integrity flight path exceeds a third threshold.

4. The method of claim 1 further comprising:
   providing by the processor the second alert signal and the high integrity flight path to the display when information from the flight management system is not available.

5. The method of claim 1 further comprising:
   displaying a published missed approach when the first alert signal is provided.

6. The method of claim 1 wherein the steps are accomplished in sequence and further comprising:
   repeating the step of comparing the sensor position with the high integrity flight path until the identified flight path is completed.

7. A method allowing an aircraft to navigate by required navigation performance, the aircraft including a flight management system, a processor, and a display, the method comprising:

storing a plurality of flight paths and a first cyclic redundancy check for each of the flight paths in the flight management system;

identifying one of the flight paths as a desired flight path in the flight management system;

providing the identified flight path to the display;

displaying the desired flight path even if the identified flight path is no longer being received by the display;

computing a second cyclic redundancy check by the processor for the desired flight path;

comparing by the processor the first cyclic redundancy check of the identified flight path with the second cyclic redundancy check;

providing a first alert signal by the processor to the display when the comparison of the first cyclic redundancy check of the identified flight path with the second cyclic redundancy check exceeds a first threshold;

performing at least one of the actions selected from the group consisting of:

comparing within the processor a sensor position of the aircraft as determined by the processor with a high integrity flight path;

determining a defined flight path by the flight management system and comparing the defined flight path with the high integrity flight path; and comparing the sensor position with an aircraft position determined by the flight management system;

providing by the processor a second alert signal to the display when at least one of the actions exceeds a threshold;

displaying on the display a first alert when the first alert signal is provided; and displaying on the display a second alert when the second alert signal is provided.

8. The method of claim 7 further comprising:

providing by the processor the second alert signal and the high integrity flight path to the display when information from the flight management system is not available.

9. The method of claim 7 further comprising:

displaying a published missed approach when the first alert signal is provided.

10. The method of claim 7 further comprising:

displaying the high integrity flight path when the second alert signal is provided.

11. The method of claim 7 wherein the steps are accomplished in sequence and further comprising:

repeating the steps from the step of comparing the sensor position with the high integrity flight path until the high integrity flight path is completed.

12. An aircraft navigation system comprising:

a flight management system including a navigation database and configured to:

store a plurality of flight paths and a first cyclic redundancy check for each of the flight paths; and identify one of the flight paths;

determine a sensor position of the aircraft;

a processor coupled to the flight management system, the processor configured to:

compute a second cyclic redundancy check for the identified flight path;

compare the first cyclic redundancy check with the second cyclic redundancy check;

provide a first alert signal to the display when the comparison of the first cyclic redundancy check with the second cyclic redundancy check exceeds a first threshold;

determine a high integrity flight path;

compare the sensor position with the high integrity flight path; and provide a second alert signal and the high integrity flight path when the comparison of the sensor position with the high integrity flight path exceeds a second threshold; and a display coupled to the flight management system and configured to:

receiving by the display the identified flight path;

displaying the desired flight path even if the identified flight path is no longer being received by the display;

display a first alert in response to the first alert signal; and display a second alert in response to the second alert signal.

13. The aircraft display system of claim 12 wherein the flight navigation system is further configured to:

determine a defined flight path;

and the processor is further configured to:

provide the second alert signal and the high integrity flight path when a comparison of the defined flight path with the high integrity flight path exceeds a third threshold.

14. The aircraft display system of claim 12 further comprising an external sensor configured to:

sense a second position of the aircraft; and wherein the processor is further configured to:

provide the second alert signal and the high integrity flight path when a comparison of the sensor position with an aircraft position determined by the flight management system exceeds a third threshold.

15. The aircraft display system of claim 12 wherein the processor is further configured to:

provide the second alert signal and the high integrity flight path to the display when information from the flight management system is not available.

16. The aircraft display system of claim 12 wherein the processor is further configured to:

display a published missed approach when the first alert signal is provided.

17. The aircraft display system of claim 12 wherein the steps are processed in sequence and the processor is further configured to:

repeat the steps from the step of comparing the sensor position with the high integrity flight path until the aircraft has completed flying the high integrity flight path.

* * * * *